United States Patent [19]

Ishikawa

[11] Patent Number: 5,477,220
[45] Date of Patent: Dec. 19, 1995

[54] METHOD FOR DETECTING RELATIVE TRAVEL DIRECTION OF A VEHICLE

[75] Inventor: Masataka Ishikawa, Higashimatsuyama, Japan

[73] Assignee: Zexel Corporation, Saitama, Japan

[21] Appl. No.: 866,188

[22] PCT Filed: Sep. 2, 1991

[86] PCT No.: PCT/JP91/01174

§ 371 Date: Jun. 24, 1992

§ 102(e) Date: Jun. 24, 1992

[30] Foreign Application Priority Data

Sep. 4, 1990 [JP] Japan .................................. 2-234235

[51] Int. Cl.⁶ ................................................ G08G 1/123
[52] U.S. Cl. ............................................. 340/988; 364/449
[58] Field of Search ................................. 340/988, 990, 340/995, 935, 465; 364/449, 460, 443; 73/178 R

[56] References Cited

U.S. PATENT DOCUMENTS 4,084,241 4/1978 Tsumura .................................. 340/995
4,788,645 11/1988 Zavoli et al. ........................... 340/988
5,058,023 10/1991 Kozikaro ................................ 340/988

FOREIGN PATENT DOCUMENTS 62-240811 10/1987 Japan .
62-298716 12/1987 Japan .
64-88311 4/1989 Japan .
2129515 5/1990 Japan .

Primary Examiner—Brent Swarthout
Attorney, Agent, or Firm—Pollock, Vande Sande & Priddy

[57] ABSTRACT

To detect the relative travel direction of a vehicle, the distances (A, B) traveled by the right front wheel and the left front wheel of the vehicle are detected, the turning angle (θ) of the vehicle is calculated only on the basis of the travel distances of the right front wheel and the left front wheel, the tread width (T) and the wheelbase (W) of the vehicle, whereby the relative travel direction is detected.

10 Claims, 2 Drawing Sheets

METHOD FOR DETECTING RELATIVE TRAVEL DIRECTION OF A VEHICLE

TECHNICAL FIELD

The present invention relates to a relative direction detecting method for detecting the relative travel direction of a vehicle.

BACKGROUND OF THE INVENTION

In recent years, various vehicular navigation systems capable of informing the driver of the current location of the vehicle have been developed. One known navigation system of this type detects the distance traveled and the relative travel direction of the vehicle at prescribed time intervals, successively calculates the vector sum of these detection results, and displays the current location of the vehicle by means of an appropriate display device on the basis of the calculated result and the given initial vehicle location information.

This kind of navigation system requires detection of the relative direction of the vehicle as described above, and for this reason there is a well-known arrangement for detecting the relative travel direction on the basis of the difference between the rotational angle of the left wheel and that of the right wheel, which occurs at the time of vehicle turning, by means of rotational sensors on a pair of wheels.

Japanese Patent Application Public Disclosure No. Sho 62-298716, for example, discloses a method for detecting the relative travel direction of a vehicle, in which information concerning rotational angles of the left and right front wheels is obtained by means of rotational speed sensors mounted on left and right front wheels, information concerning the average distance traveled by the rear wheels is also obtained, and on the basis of this information, information concerning the relative travel direction is obtained free from the detection error owing to the steering mechanism.

However, this proposed method has a disadvantage in that since at least one sensor is needed for detecting the average distance traveled by the rear wheels in addition to two speed sensors for detecting the wheel rotation angles of the two front wheels, the number of sensors required is large and the processing circuit for processing the signals generated by the sensors is complicated.

To overcome these disadvantages, an arrangement making use of the rotation of the cable of the already installed speedometer can be used. According to this method, although the number of sensors is not increased, the accuracy cannot help being unsatisfactory, so that it is difficult to detect the location of the vehicle with high accuracy.

It is an object of the present invention to provide an improved relative direction detecting method for a vehicle which is capable of detecting the relative travel direction of the vehicle with high accuracy only by detecting information concerning the rotational angles of the left and right front wheels.

DISCLOSURE OF THE INVENTION

One feature of the present invention resides in that: in a relative direction detecting method for detecting the relative travel direction of a vehicle, the distance traveled by the right front wheel and the left front wheel of the vehicle are detected, and the turning angle of the vehicle is calculated on the basis of only the distances traveled by the right front wheel and the left front wheel, the tread width of the vehicle and the wheelbase of the vehicle, whereby the relative direction is detected.

Another feature of the present invention resides in that: in a method for detecting the relative location of a vehicle on the basis of the relative travel direction of the vehicle, the distances traveled by the right and left front wheels of the vehicle are detected, the turning angle of the vehicle is calculated on the basis of only the detected distances traveled by the two front wheels, the tread width of the vehicle and the wheel base of the vehicle, the distance traveled by a middle point midway between a pair of rear wheels is calculated on the basis of the calculated turning angle, the aforesaid tread width and the aforesaid distances traveled by the wheels, and the traveling locus vectors of the vehicle are calculated on the basis of the calculated turning angle and the aforesaid distance traveled by the middle point midway between the pair of rear wheels, whereby the relative location of the vehicle is detected.

The required calculations may be carried out by, for example, a general-purpose microcomputer, or by a predetermined dedicated calculation device.

DETAILED DESCRIPTION OF BEST MODE FOR CARRYING OUT THE INVENTION

Figure 1:
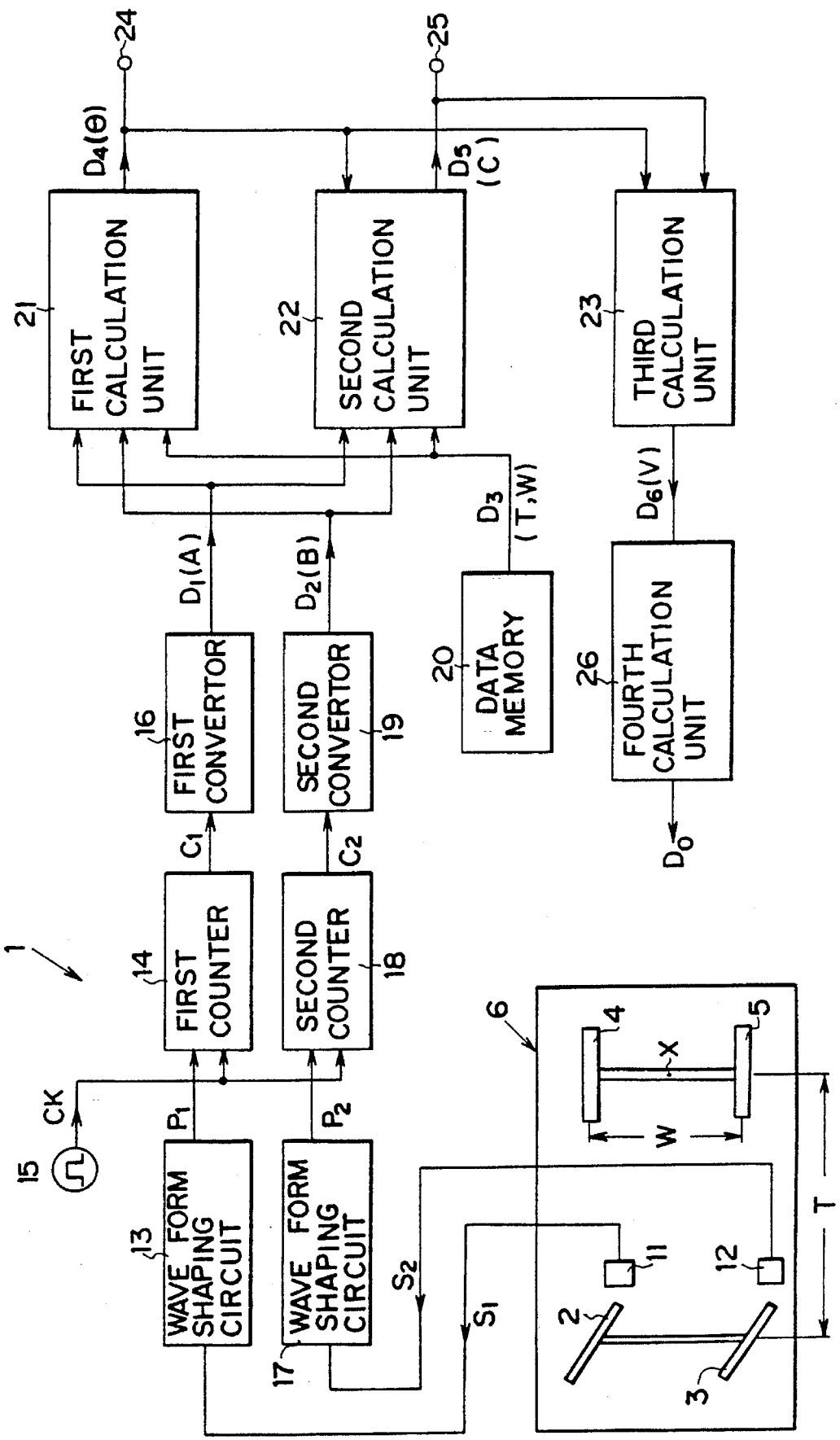
FIG. 1 is a block diagram showing an embodiment of the system for detecting the relative direction and relative location of a vehicle according to the present invention.

FIG. 1 is a schematic block diagram showing an embodiment of the system for detecting the relative travel direction for a vehicle according to the present invention. This detecting system 1 is arranged to detect the relative travel direction and the relative location of a vehicle 6 having a right-front wheel 2, a left-front wheel 3, a right-rear wheel 4, and a left-rear wheel 5. The detecting system 1 has a first sensor 11 for producing a first detection signal $S_1$ with a period corresponding to the rotational speed of the right-front wheel 2, and a second sensor 12 for producing a second detection signal $S_2$ with a period corresponding to the rotational speed of the left-front wheel 3.

The first and second sensors 11 and 12 are speed sensors of well-known design. The wave form of the first detection signal $S_1$ carrying the information of the rotational angle of the right-front wheel 2 is shaded by a wave form shaping circuit 13 associated therewith, to obtain a pulse train signal $P_1$ which is supplied as a counting pulse to a first counter 14. The first counter 14 receives a clock pulse CK as set/reset pulses generated by a clock pulse generator indicated by reference numeral 15, and counts the number of pulses of the pulse train signal $P_1$ input within a prescribed period of time which is determined by the pulse width of the clock pulse CK.

The first counter 14 then generates a first count signal $C_1$ showing the count result, which is input to a first converter 16. The first count signal $C_1$ is multiplied by a prescribed constant α, by the first converter 16, which produces a first data $D_1$ showing the distance A traveled by the right-front wheel 2 corresponding to the pulses number of indicated by the first count signal $C_1$.

In the same manner as described above, the wave form of a second detection signal $S_2$ carrying the information of the rotational angle of the left-front wheel 3 is shaded by a wave form shading circuit 17 associated therewith, to obtain a pulse train signal $P_2$ which is supplied as a counting pulse to a second counter 18. The second counter 18 further receives the clock pulse CK as set/reset pulses generated by the clock pulse generator 15, and counts the number of pulses of the pulse train signal $P_2$ input within a prescribed period of time which is determined by the pulse width of the clock pulse CK.

The second converter 18 generates a second count signal $C_2$ showing the count result, which is input to a second converter 19. The second count signal $C_2$ is multiplied by a prescribed constant $\alpha_2$ by the second converter 19, which produces a second data $D_2$ showing the distance B traveled by the left-front wheel 3 corresponding the number of pulses indicated by the second count signal $C_2$.

Reference numeral 20 indicates a data memory storing wheelbase data W and the tread width data T, which are data peculiar to the vehicle 6. The data showing the values of W and T is supplied as a third data $D_3$ from the data memory 20 to first and second calculation units 21 and 22, which also receive the first and second data $D_1$ and $D_2$.

The first calculation unit 21 responds to the first to third data $D_1$ to $D_3$, and calculates the turning angle $\theta$ of the vehicle 6 in accordance with the following equation:

$$\theta = \frac{T^2(A^2+B^2) - 4T^4 A^2 B^2 - 4T^2 W^2 (A^2-B^2)^2}{T^4 + 4T^2 W^2} \quad (1)$$

In this equation, A is the distance traveled by the right-front wheel 2 and B is the distance traveled by the left-front wheel 3. The first calculation unit 21 then generates data $D_4$ showing the calculated turning angle $\theta$.

The equation (1) will now be explained with reference to FIG. 2.

Figure 2:
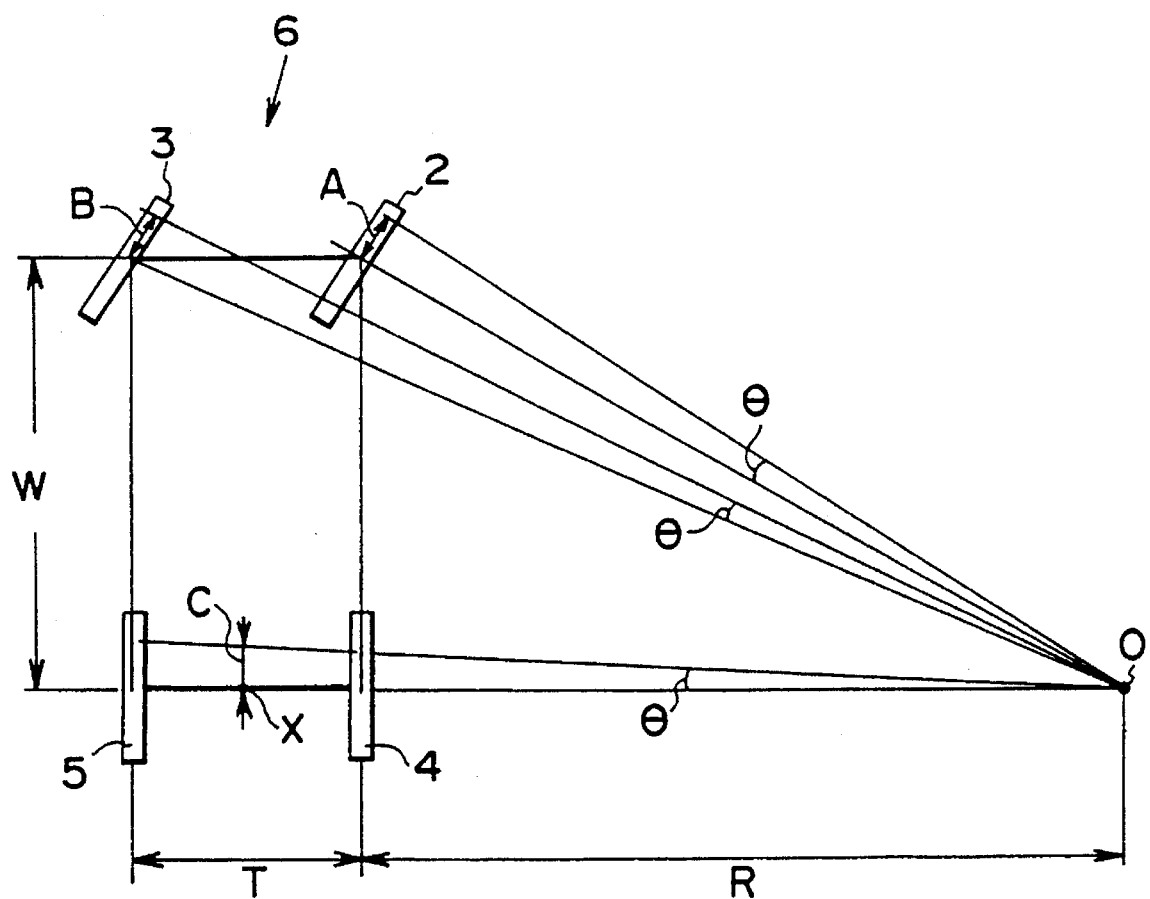
FIG. 2 is a diagram for describing the formula for a turning angle calculation according to the present invention.

In FIG. 2, reference symbol O indicates the center of the turning circle of the vehicle 6, and reference symbol R indicates the distance from the center O to the right-rear wheel 4. When the vehicle 6 turns by an angle $\theta$, if the left-front wheel 3 moves by a distance B and the right-front wheel 2 moves by a distance A, the following equations hold:

$$A = \alpha 1 \cdot C_1 \quad (2)$$

$$B = \alpha 2 \cdot C_2 \quad (3)$$

It is also possible to obtain the following equations (4) and (5) in accordance with FIG. 2:

$$A = (T+R)^2 + W^2 \cdot \theta \quad (4)$$

$$B = R^2 + W^2 \cdot \theta \quad (5)$$

Then, equations (6) and (7) can be obtained by making use of the equations (4) and (5):

$$A^2 = \{(T+R)^2 + W^2\}^2 \cdot \theta^2 \quad (6)$$

$$B^2 = (R^2 + W^2)^2 \cdot \theta^2 \quad (7)$$

The aforesaid equation (1) can be obtained by eliminating the unknown quantity R by making use of the equations (6) and (7).

Thus, the calculation according to the equation (1) is carried out by the calculation unit 21 on the basis of the first to the third data $D_1$ to $D_3$, whereby the value of the turning angle $\theta$ at the time is obtained. In addition, the distance C traveled by the middle point X midway between the rear wheels can be expressed as follows with reference to FIG. 2:

$$C = \left( R + \frac{T}{2} \right) \times \theta \quad (8)$$

Then, the following equation (9) is obtained by making use of the equations (6) and (7):

$$A^2 - B^2 = \theta^2 \cdot (T^2 + 2TR) \quad (9)$$

According to the equations (8) and (9), the following equation (10) is obtained:

$$\left( R + \frac{T}{2} \right) \times \theta = \frac{A^2 - B^2}{2\theta T} \quad (10)$$

Then, the right part of the equation (8) can be replaced with the left part of the equation (10) to obtain the following equation (11):

$$C = \frac{A^2 - B^2}{2\theta T} \quad (11)$$

Returning to FIG. 1, the second calculation unit 22 is calculating the distance c traveled by the middle point X midway between the rear wheels 4 and 5 in accordance with the equation (11), and receives a fourth data $D_4$ generated by the first calculation unit 21. The second calculation unit 22 produces fifth data $D_5$ showing the calculated distance C at that time, that is, the distance traveled by the vehicle 6, and the fifth data $D_5$ is input to a third calculation unit 23 which also receives the fourth data $D_4$.

The third caculation unit 23 calculates the traveling locus vector of the vehicle 6, that is the locus vector V showing the traveling locus of the point X on the basis of the rotational angle and the distance C traveled by the vehicle 6 at that time, and produces sixth data $D_6$ showing the result of the calculation. In addition, the fourth data $D_4$ and the fifth data $D_5$ can be extracted from other output terminals 24 and 25 when necessary.

The sixth data $D_6$ showing the relative travel direction vector v at that time is added successively to the locus vectors obtained up to then by a fourth calculation unit 26 in a conventional manner to produce data $D_0$ showing the relative travel direction and the location of the vehicle at that time.

As will be understood from the forgoing description, the relative direction and relative location of a vehicle can be detected only by detecting the respective rotational speeds of the left and right front wheels separately by means of the wheel rotational speed sensors mounted on the left and right front wheels In addition, it is possible to replace the first and second calculation units 21 and 22 with a microcomputer for carrying out the above mentioned calculations in accordance with a prescribed program.

Industrial Applicability

In conclusion, a method for detecting the relative direction traveled by a vehicle according to the present invention is suitable for detecting the direction and/or location of the vehicle in a vehicular navigation system.

What is claimed is:

1. A method for providing the current location of a vehicle, said method comprising steps of:

detecting with a first sensor the rotational speed of a right front wheel of the vehicle, said first sensor producing a first detection signal corresponding to said right wheel speed;

outputting with a first converter first data representative of the distance traveled by a right front wheel of the vehicle within a prescribed period of time, said first converter being responsive to said first detection signal;

detecting with a second sensor the rotational speed of a left front wheel of the vehicle, said second sensor producing a second detection signal corresponding to said left wheel speed;

outputting with a second converter second data representative of the distance traveled by a left front wheel of the vehicle within said prescribed period of time, said second converter being responsive to said second detection signal;

storing in a data storage device wheel base data W and tread width data T;

outputting from said data storage device third data representative of said data W and T;

calculating with a first calculation means the turning angle of the vehicle only on the basis of the travel distances of the right front wheel and the left front wheel, the tread width and the wheelbase of the vehicle, said first calculation means comprising a calculating unit responsive to said first, second and third data for performing said calculation of the turning angle;

outputting with first output means turning angle data representative of said turning angle;

calculating with a second calculation means travel distance data representative of the travel distance of a middle point midway between a pair of rear wheels of the vehicle on the basis of said turning angle data, the tread width data T, and the first and second data representative of the travel distances of the right front and left front wheels;

outputting with second output means said travel distance data;

calculating with a third calculation means successive travel locus vectors of said middle point on the basis of said turning angle data and said travel distance data;

adding with said third calculation means a current one of said vectors to previous ones of said vectors to provide position data representative of the current location of the vehicle; and, outputting with third output means said position data to a vehicular navigation system for displaying the current location of the vehicle to an occupant thereof.

2. A method as claimed in claim 1, wherein said first detection step comprises:

a step for generating with a wave shaping circuit a pulse each time the right front wheel turns by a prescribed angle;

a counting step for counting with a counter the number of pulses produced per said time period; and a step for obtaining with said calculating unit said first data representative of the travel distance of the right front wheel per said time period on the basis of the count result obtained in the counting step.

3. A method as claimed in claim 1, wherein said second detection step comprises:

a step for generating with a wave shaping circuit a pulse each time the left front wheel turns by a prescribed angle;

a counting step for counting with a counter the number of pulses produced per said time period; and a step for obtaining with said calculating unit said first data representative of the travel distance of the left front wheel of the vehicle per said time period on the basis of the count result in the counting step.

4. A method as claimed in claim 1, wherein said first calculation step calculates the turning angle θ as:

$$\theta = \frac{T^2(A^2+B^2) - 4T^4A^2B^2 - 4T^2W^2(A^2-B^2)^2}{T^4 + 4T^2W^2}$$

where A is the travel distance of the right front wheel, B is the travel distance of the left front wheel, T is the tread width, and W is the wheelbase of the vehicle.

5. A method as claimed in the claim 1, wherein said second calculation step calculates the travel distance C of the middle point midway between the pair of rear wheels as:

$$C = \frac{A^2 - B^2}{2\theta T}$$

where A is the travel distance of the right front wheel, B is the travel distance of the left front wheel, T is the tread width, and θ is the turning angle.

6. An apparatus for providing the current location of a vehicle, said apparatus comprising:

first detection means for detecting the distance traveled by a right front wheel of the vehicle within a prescribed period of time, and for outputting first data representative of said right front wheel travel distance, said first detection means comprising a first sensor for producing a first detection signal corresponding to the rotational speed of the right front wheel, and a first converter responsive to said first detection signal for outputting said first data;

second detection means for detecting the distance traveled by a left front wheel of the vehicle within said prescribed period of time, and for outputting second data representative of said left front wheel travel distance, said second detection means comprising a second sensor for producing a second detection signal corresponding to the rotational speed of the left front wheel, and a second converter responsive to said second detection signal for outputting said second data;

first calculation means for calculating the turning angle of the vehicle only on the basis of the travel distances of the right front wheel and the left front wheel, the tread width and the wheelbase of the vehicle, said first calculation means comprising a data storage device for storing wheel base data W and tread width data T and outputting third data representative of said data W and T, and a calculating unit responsive to said first, second and third data for performing said calculation of the turning angle;

first output means for outputting turning angle data representative of said turning angle;

second calculation means for calculating travel distance data representative of the travel distance of a middle point midway between a pair of rear wheels of the vehicle on the basis of said turning angle data, the tread width data T, and the first and second data representative of the travel distances of the right front and left front wheels;

second output means for outputting said travel distance data; and, third calculation means for calculating successive travel locus vectors of said middle point on the basis of said turning angle data and said travel distance data, and for adding a current one of said vectors to previous ones of said vectors to provide position data representative of the current location of the vehicle; and, third output means for outputting said position data to a vehicular navigation system for displaying the current location of the vehicle to an occupant thereof.

7. An apparatus as claimed in claim 6, wherein said first detection means comprises a wave shaping circuit for generating a pulse each time the right front wheel turns by a prescribed angle, and a counter for counting the number of pulses produced per said time period; and wherein said calculating unit obtains the travel distance of the right front wheel per said time period on the basis of the count result produced by said counter.

8. An apparatus as claimed in claim 6, wherein said second detection means comprises a wave shaping circuit for generating a pulse each time the left front wheel turns by a prescribed angle, and a counter for counting the number of pulses produced per said time period; and wherein said calculating unit obtains the travel distance of the left front wheel of the vehicle per said time period on the basis of the count result produced by said counter.

9. An apparatus as claimed in claim 6, wherein said first calculation means calculates the turning angle $\theta$ as:

$$\theta = \frac{T^2(A^2+B^2) - 4T^4A^2B^2 - 4T^2W^2(A^2-B^2)^2}{T^4 + 4T^2W^2}$$

where A is the travel distance of the right front wheel, B is the travel distance of the left front wheel, T is the tread width, and W is the wheelbase of the vehicle.

10. An apparatus as claimed in claim 6, wherein said second calculation means calculates the travel distance C of the middle point midway between the pair of rear wheels as:

$$C = \frac{A^2 - B^2}{2\theta T}$$

where A is the travel distance of the right front wheel, B is the travel distance of the left front wheel, T is the tread width, and $\theta$ is the turning angle.

* * * * *